United States Patent
Kurita et al.

(10) Patent No.: US 8,066,498 B2
(45) Date of Patent: *Nov. 29, 2011

(54) MAGNETIC FIELD MOLDING DEVICE, METHOD FOR PRODUCING FERRITE MAGNET, AND DIE

(75) Inventors: Hideo Kurita, Tokyo (JP); Yasuhiro Nagatsuka, Tokyo (JP); Kiyoyuki Masuzawa, Tokyo (JP); Masayuki Ohtsuka, Tokyo (JP); Kazuyuki Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 956 days.

This patent is subject to a terminal disclaimer.

(21) Appl. No.: 11/534,276

(22) Filed: Sep. 22, 2006

(65) Prior Publication Data
US 2007/0069426 A1 Mar. 29, 2007

(30) Foreign Application Priority Data
Sep. 29, 2005 (JP) .................................. 2005-285314

(51) Int. Cl.
 *B29C 33/02* (2006.01)
 *B29C 33/42* (2006.01)
(52) U.S. Cl. ...................... 425/3; 425/144; 425/174.8 R; 425/412
(58) Field of Classification Search ............... 425/3, 78, 425/143–144, DIG. 33, 174.8 R, 407, 412
See application file for complete search history.

(56) References Cited

U.S. PATENT DOCUMENTS

| | | | | |
|---|---|---|---|---|
| 4,333,895 A * | 6/1982 | Strawson et al. | ............ | 264/427 |
| 4,416,603 A * | 11/1983 | Peltsman et al. | ............ | 425/153 |
| 5,427,734 A * | 6/1995 | Yamashita et al. | ............ | 419/23 |
| 5,489,343 A * | 2/1996 | Uchida et al. | ................ | 148/103 |
| 6,033,198 A * | 3/2000 | Furlani et al. | ..................... | 425/3 |
| 6,302,669 B1 * | 10/2001 | Nishizawa et al. | ............... | 425/3 |
| 6,332,932 B1 * | 12/2001 | Kohara et al. | ................. | 148/301 |
| 6,338,618 B1 * | 1/2002 | Van Ert et al. | .................... | 425/3 |
| 7,367,791 B2 * | 5/2008 | Murata et al. | ..................... | 425/3 |
| 2003/0155674 A1 * | 8/2003 | Olaru | ......................... | 264/40.6 |
| 2004/0018266 A1 * | 1/2004 | Clarke | ....................... | 425/256 |
| 2006/0219323 A1 | 10/2006 | Masuzawa et al. | | |

FOREIGN PATENT DOCUMENTS

JP 61-095506 5/1986
(Continued)

OTHER PUBLICATIONS

International Prelimiary Examination Report for PCT/JP2005/006026.*

(Continued)

*Primary Examiner* — Joseph Del Sole
*Assistant Examiner* — Ryan Ochylski
(74) *Attorney, Agent, or Firm* — Pearne & Gordon LLP

(57) ABSTRACT

The objects of the present invention are to provide a magnetic field molding device capable of improving yield in a production and stabilizing product quality, and a method for producing a ferrite magnet. In molding in a magnetic field, the mortar-shaped die 19 provided with a plurality of the cavities 13 is heated by the heater member 20, provided in the heater block located under the mortar-shape die 19, under control of a controller at varying temperature depending on the position of the mortar-shape die 19, to keep uniform temperature of the slurry in the cavities 13. This assures good and stable slurry dehydration properties and improves product yield.

13 Claims, 10 Drawing Sheets

FOREIGN PATENT DOCUMENTS

| | | | |
|---|---|---|---|
| JP | 62-135323 A | 6/1987 | |
| JP | 01-54167 | 11/1989 | |
| JP | 02-116104 A | 4/1990 | |
| JP | 04-284605 | 10/1992 | |
| JP | 06-182728 | 7/1994 | |
| JP | 06182728 A | * | 7/1994 |
| JP | 08-132541 A | 5/1996 | |
| JP | 09-327812 | 12/1997 | |
| JP | 09327812 A | 12/1997 | |
| JP | 2000-141392 A | 5/2000 | |
| JP | 2000-190371 | 7/2000 | |
| JP | 2005074892 A | 3/2005 | |
| WO | 2005/096331 A1 | 10/2005 | |

OTHER PUBLICATIONS

Notification of First Office action received in Corresponding Chinese Patent Application No. 200610146500.1; text of the first Office action.

European Search Report for corresponding European Application No. 06 02 0398 dated Jul. 6, 2010.

* cited by examiner

MAGNETIC FIELD MOLDING DEVICE, METHOD FOR PRODUCING FERRITE MAGNET, AND DIE

BACKGROUND OF THE INVENTION

1. Field of the Invention

The present invention relates to a magnetic field molding device, method for producing ferrite magnet and die which can be used for them.

2. Description of the Related Art

Ferrite (sintered) magnets are massively going into widely diversified areas, e.g., vehicles, home electric/electronic appliances and industrial machines, because of their improved properties and relative inexpensiveness.

Ferrite magnets are produced by a series of steps of calcining a raw material mixture with a given composition into a ferrite state, milling the resulting calcined body into a fine ferrite powder of submicron size, compression-molding the powder into a molded body using a die in a magnetic field (hereinafter referred to as magnetic field molding), and sintering the molded body into a ferrite magnet.

The processes for magnetic field molding fall into two general categories; dry process wherein the powder is molded as a dried material and wet process wherein the powder is molded as a slurry.

The wet magnetic field molding involves a problem of decreased production yield resulting from cracking or the like of the molded body, unless the slurry is dehydrated enough to remove its water content.

Therefore, there has been proposed a technique for improving the dehydration properties of the slurry in which the slurry be heated before it is injected into a die to reduce its viscosity and thereby to improve its dehydration properties, as disclosed in, e.g., Patent Documents 1, 2 and 3.

Patent Document 1 proposes a technique in which a heating device for heating a slurry is provided between a die assembly and a pressure pump for pumping the slurry to the die assembly.

This technique, however, which uses an electric heater tube or water bath as the heating device, involves a problem of needing a long heating time. Patent Document 2, in an attempt to solve the above problem, proposes a technique in which microwaves are used to uniformly heat the slurry in a shorter time.

Patent Document 3 proposes the following techniques. That is, the slurry in a tank is directly heated by a pipe heater or the like before being injected into the die; or indirectly heated by hot water or the like circulating over the tank; or the slurry is flowing in a pipe connecting the tank to the die, into which it is to be automatically injected, and the slurry is heated by heating the pipe periphery. Thereby, the slurry is kept from 40 through 90° C.

However, the inventors of the present invention have found that injection of the heated slurry into a die causes problems resulting from decreased temperature of the slurry and consequently increased viscosity of its dispersion medium, because it is quenched by the die or the like.

The technique disclosed by Patent Document 3 has the essence of keeping the slurry from 40 through 90° C. in a die, for which it is heated while it is held in a tank before being sent to the die directly by a pipe heater of the like or indirectly by hot water or the like circulating over the tank, or while it is flowing in a pipe to the die, into which it is to be automatically injected, by heating the pipe periphery, as described above. It is however practically difficult to keep the slurry from 40 through 90° C. in a die by the above-described heating procedure, because it is quenched when injected into the die, as described above. This has been experimentally confirmed.

In order to solve these problems, a technique is proposed, e.g., by Patent Document 4 which discloses a structure provided with a heating member for heating the slurry in such a way to encompass a die cavity (molding space).

[Patent Document 1] Japanese Patent Publication No. 1-54167 (Claims)
[Patent Document 2] Japanese Patent Laid-Open No. 6-182728 (Claim 1)
[Patent Document 3] Japanese Patent Publication No. 2-13924 (Claims and Page 3)
[Patent Document 4] Japanese Patent Publication No. 1-54168 (Claims)

SUMMARY OF THE INVENTION

A die cavity is formed into a mortar shape and machined highly precisely. The heating member for heating slurry, as the technique disclosed by Patent Document 4, should be provided on the mortar-shaped die. It is however very difficult to bore the mortar-shaped die and pass the members through the bores. Moreover, these bores may decrease strength and hence durability of the mortar-shaped die.

Therefore, this technique is not considered to provide an effective measure to practically solve the above problems.

These problems are particularly noted in such a case where a large-size die is used for providing a plurality of cavities therein, etc, in order to produce a plurality of molded bodies by one die, because the heat capacity of such a die is very large. In these cases, the conventional techniques are difficult to effectively solve the problem of cracking of molded bodies. Moreover, in a die provided with a plurality of cavities, slurry temperature may fluctuate cavity by cavity, depending on their positions in the die. This may cause fluctuation of dehydration properties of the slurry, cavity by cavity, and eventually density itself of the finally obtained molded bodies and product weight.

In addition, die temperature may change with ambient temperature and consequently viscosity of the dispersion medium in the slurry may change in a die, leading to dehydration properties variation of the slurry, season by season, not to stabilize product quality.

The present invention has been developed to solve these technical problems. The objects of the present invention are to provide a magnetic field molding device, capable of improving yield in a production line and stabilizing product quality, method for producing a ferrite magnet and the like.

The magnetic field molding device of the present invention, developed to solve these problems, is used in producing a ferrite magnet, comprising a die into which a molding slurry, produced by dispersing a powder mainly composed of ferrite in a dispersion medium, is injected to be compression-molded; magnetic field generating source which applies a magnetic field in a given direction to the slurry in the die; delivery path provided in the die for injecting the slurry into the cavity for forming a ferrite magnet; heater provided under the die cavity for heating the slurry flowing in the delivery path; and controller for controlling the heater.

Heating by the heater the slurry flowing in the delivery path, which is provided in the die, prevents temperature decrease of the slurry to be injected into the cavity and assuredly improve its dehydration properties. The heater can heat not only the molding slurry but also the mortar-shaped die, which further prevents temperature decrease of the slurry in the cavity.

Moreover, providing the heater under the die cavity prevents decrease of die strength around the cavity, in which a ferrite magnet is molded.

The heater to be located under the die cavity may be provided under the mortar-shaped die or lower die cavity forming the die. More preferably, a block member is provided as a separate member from the mortar-shaped die and is fixed to the bottom of the mortar-shaped die forming the die, and the delivery path and heater are provided in the block member.

This structure allows for separately boring the block member for mounting the delivery path and heater. Use of a material less hard than a die material for forming a block member facilitates its machining.

It is preferable that the block member is kept at 40 to 120° C. by the controller, more preferably 40 to 100° C., still more preferably 40 to 80° C., all inclusive.

The present invention is particularly effective for a die provided with a plurality of cavities for producing a plurality of ferrite magnets by one die. In this case, the die is preferably provided further with a temperature control unit to adjust temperature distributions in a plurality of cavities.

A die having an asymmetric structure tends to cause problems of varying density of the molded body finally obtained and product weight, because slurry temperature varies depending on cavity position in the die to cause variations of slurry dehydration properties cavity by cavity. For example, a slurry injected into a die decreases die temperature more on the slurry injection port side than on the opposite side, significantly varying die temperature depending on the position. A die provided with a washing mechanism with a brush which washes the die surface between the molding cycles may have temperature decreased by a wash solution on the brush, more notably at a position closer to the washing start point. Thus, die temperature distribution tends to vary by various reasons.

The present invention, developed to solve these problems, is a magnetic field molding device for producing ferrite magnets, comprising a die provided with a plurality of cavities into which a molding slurry, produced by dispersing a powder mainly composed of ferrite in a dispersion medium, is injected to be compression-molded; magnetic field generating source which applies a magnetic field in a given direction to the slurry in the die; and temperature control unit which adjusts temperature distributions in a plurality of the cavities in the die.

The temperature control unit may comprise a plurality of heaters provided in the die for heating the die and a controller for controlling a plurality of the heaters independently. In another structure, the temperature control unit may comprise a plurality of heaters of different heating value provided in the die and a controller for controlling the heaters collectively.

The heater may have a heating value varying depending on the position. For example, winding pitch of a heating wire may be changed depending on the position in the same heater to locally change the heating value.

The temperature control unit can adjust temperature distributions in a plurality of the cavities in the die, thereby uniformly distributing temperature of the as-injected molding slurry.

It is preferable that the number of the heaters is at least "m", where "m" is the number of rows of the cavities orderly lined up in the die. Moreover, it is preferable that the number of the heaters is at least "n", where "n" is the number of the cavities in the die. Temperature can be adjusted finely by providing a number of heaters.

The die is also provided with a delivery path by which a molding slurry is injected individually into the cavities. The heater is preferably positioned in the vicinity of the delivery path, because the path vicinity tends to have temperature significantly changing by the slurry passing through the path.

The present invention can be also considered to be a method for producing a ferrite magnet. It can comprise a molding step in which a molding slurry, produced by dispersing a powder mainly composed of ferrite in a dispersion medium, is injected into a plurality of cavities provided in a die to be compression-molded in a magnetic field of given direction, after the cavities are heated by a plurality of heaters set at varying temperature levels, to produce molded bodies; and a sintering step in which the molded bodies are sintered into a ferrite magnet.

Heating a plurality of the cavities by a plurality of the heaters set at varying temperature levels allows for adjusting temperature distributions in a plurality of the cavities in the die and thereby uniformly distributing temperature of the molding slurry injected in each of the cavities.

The die of the present invention is used to compression-mold a molding slurry in which a powder mainly composed of ferrite is dispersed in a dispersion medium to produce a molded body of a given shape in the ferrite magnet production process. It is characterized by being provided with one or more cavities for obtaining a molded body, delivery path for injecting the molding slurry, supplied from the outside of the die, into the individual cavity (cavities) and a heater for heating the die to a temperature varying depending on the position.

It is preferable that the die is provided further with a block member, separately from the mortar-shaped die, and the block member is fixed to the bottom of the mortar-shaped die which constitutes the die, and heaters are provided in the block member. The heaters may be arranged along a row of the cavities orderly lined up in the die.

The delivery path preferably has a volume at least the same as the volume of molding slurry to be injected into a plurality of the cavities for one molding cycle, wherein the molding slurry volume for one molding cycle is a volume of a molding slurry including the materials corresponding to a total weight (dry basis) of the molded bodies produced by one molding cycle. This allows the slurry to be totally heated before it is injected into the cavities while the slurry previously charged in the cavities is compression-molded.

The present invention heats a molding slurry to be injected into a cavity to reduce viscosity of the dispersion medium in the slurry. This allows the slurry to keep its dehydration properties at a high level during the molding process in a magnetic field. Adjusting temperature distributions in a plurality of the cavities in the die can uniformly distribute temperature of the molding slurry injected into each of the cavities, thereby reducing slurry dehydration property variations and realizing a uniform density of the molded bodies finally obtained to improve/stabilize product quality, reduce defective products and improve yield in the production process.

DETAILED DESCRIPTION OF THE PREFERRED EMBODIMENTS

The present invention is described in detail based on the embodiments by referring to the attached drawings.

Figure 1:
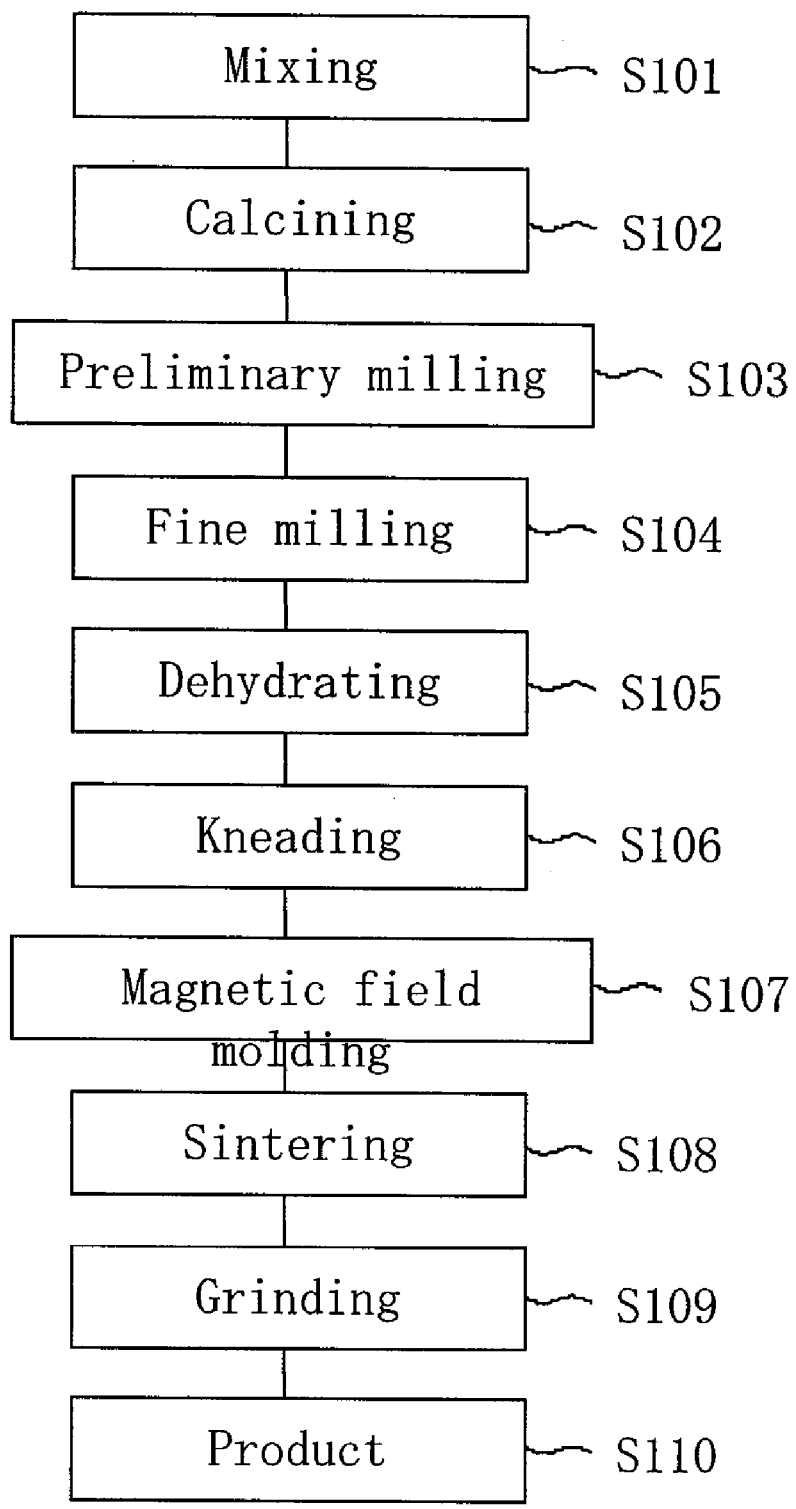
FIG. 1 illustrates a process flow in one embodiment for producing a ferrite magnet.

FIG. 1 illustrates one example of the process flow for producing a ferrite magnet. It is to be understood, needless to say, that the following embodiments are merely to aid in the understanding of the invention, and variations may be made, as required, without departing the spirit and scope of the invention.

As shown in FIG. 1, in order to produce a ferrite magnet, the raw materials are first mixed to have a given composition and calcined into a ferrite state (Steps S101 and 102). The raw materials include powdered oxides, and powdered compounds which can be fired into a corresponding oxide, e.g., carbonates, hydroxides and nitrates. The calcination can be generally carried out in an oxidative atmosphere, e.g., air.

Next, the calcined body is milled by a preliminary milling step (Step S103) to produce a calcined powder composed of ferrite particles. It is then milled to a submicron size by a fine milling step (Step S104), after being added additives, as required, to produce a fine powder mainly composed of magnetoplumbite type ferrite. The preliminary and fine milling steps may be carried out by a wet or dry process. It is however preferable that the preliminary milling step is carried out by a dry process and fine milling step is carried out by a wet process, because the calcined body is generally composed of granules. In the above case, the calcined body is preliminarily milled to a given size or less in the preliminary milling step, and then made up into slurry with water and finely milled to a given size or less in the fine milling step.

Then, the finely milled powder is dispersed in a dispersion medium to produce the slurry (molding slurry) of given concentration, and the slurry is molded in a magnetic field. When the fine milling step is carried out by a wet process, the slurry may be concentrated in a dehydrating step (Step S105) to a given concentration.

The suitable dispersion media include water and liquids having a viscosity of less than 0.70 [mPa·s] at normal temperature (20° C.). These liquids include hexane, toluene, p-xylene and methanol or the like. Other dispersion media may also be used, so long as they have a viscosity of less than 0.70 [mPa·s] when injected into a heated die mentioned below.

The slurry is kneaded in Step S106, and injected into a die, where it is compression-molded in a magnetic field of a given direction in Step S107.

The molded body is sintered into the ferrite magnet in Step S108. It is then ground into a given shape to produce the ferrite magnet as the final product in Steps S109 to S110.

Figure 2:
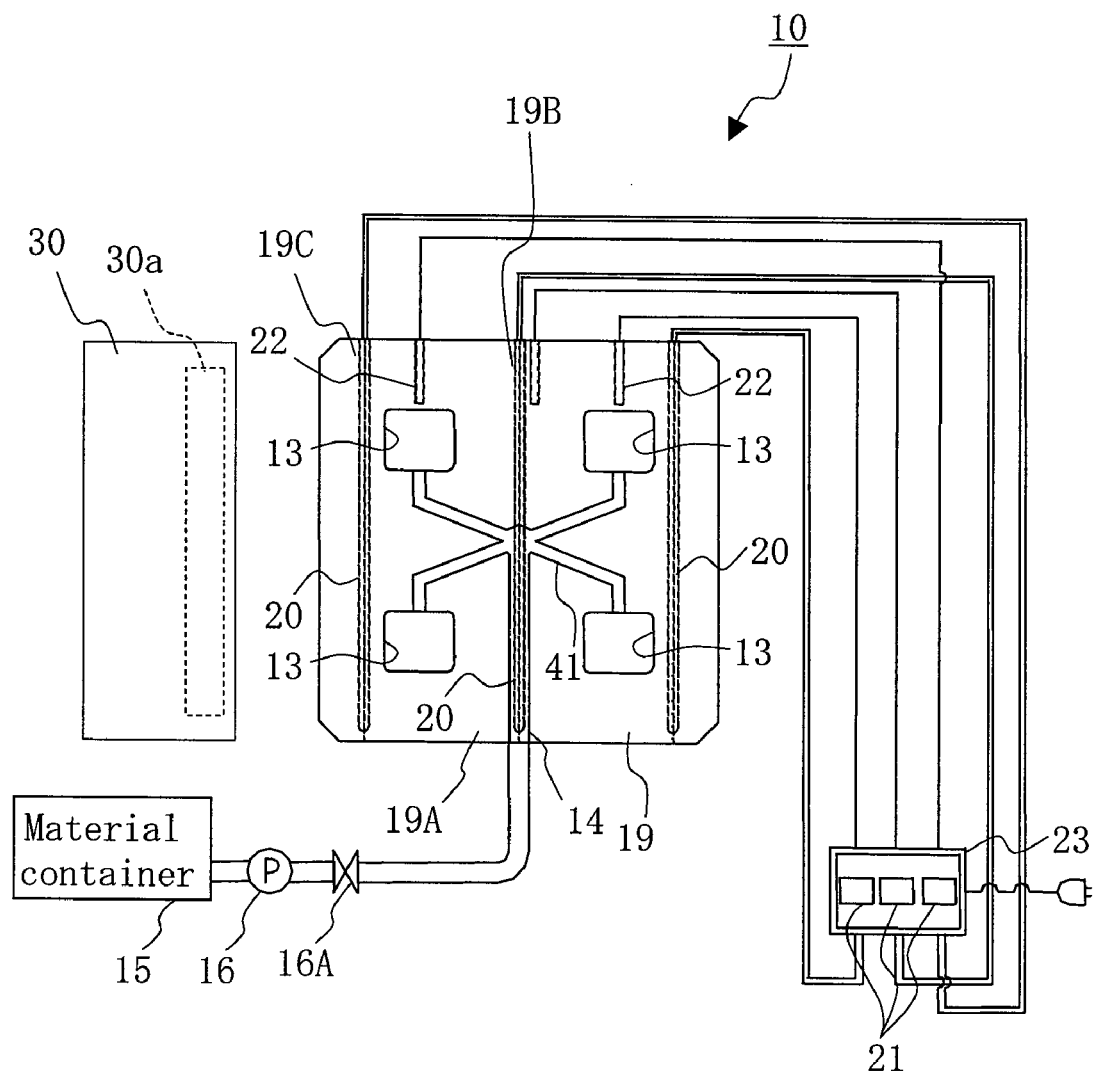
FIG. 2 illustrates an arrangement of the heaters in the molding device provided with a plurality of cavities.

FIGS. 2 and 3 outline a structure of magnetic field molding device 10 used in the above-mentioned Step S107, i.e., molding step in a magnetic field.

The magnetic field molding device 10 compression-molds a slurry of given concentration in a magnetic field to orient the ferrite particles to produce the ferrite magnet of given shape. As shown in FIG. 2, the magnetic field molding device 10 is provided with a plurality of cavities 13 for producing a plurality of ferrite magnets by one die.

FIG. 3 is a cross-sectional view of the magnetic field molding device 10, in which cavity 13 in a row is closed up. As shown, it is provided with 3 types of dies, upper die 11, lower die 12 and mortar-shaped die 19 and heater block (block member) 40. At least one of the upper die 11 and lower die 12 is driven by a driving source, e.g., driving cylinder (not shown), in such a way that they come closer to or away from each other. In this embodiment, the lower die 12 moves vertically relative to the upper die 11 at a given stroke.

The mortar-shaped die 19 may also be stationary or vertically movable.

The heater block 40 is provided under the mortar-shaped die 19 as a separate body, in which the delivery path 14 is formed to supply the slurry to the individual cavities 13. The mortar-shaped die 19 includes delivery path branches 41 branching from the delivery path 14 to individually supply the slurry to the cavities 13.

Delivery path 14 distributes the slurry, supplied from the external material container 15 by the pump 16 when the valve 16A is open, to the individual cavities 13 into which it is injected. The delivery path 14 and delivery path branches 41 preferably have a total volume at least the same as the slurry volume to be injected into a plurality of the cavities for one molding cycle.

Figure 3A:
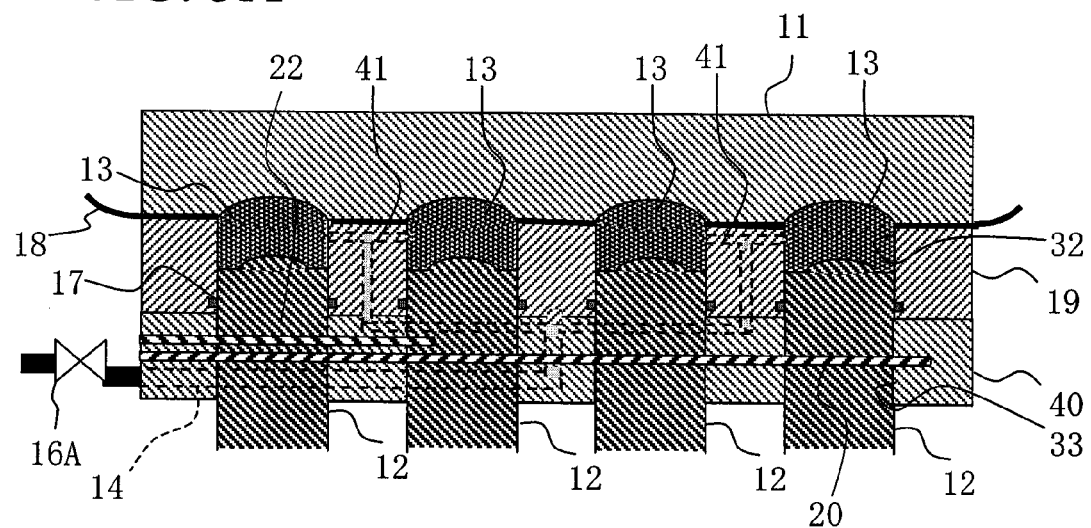
FIG. 3 is a cross-sectional view showing a part of the molding device.
Figure 3B:
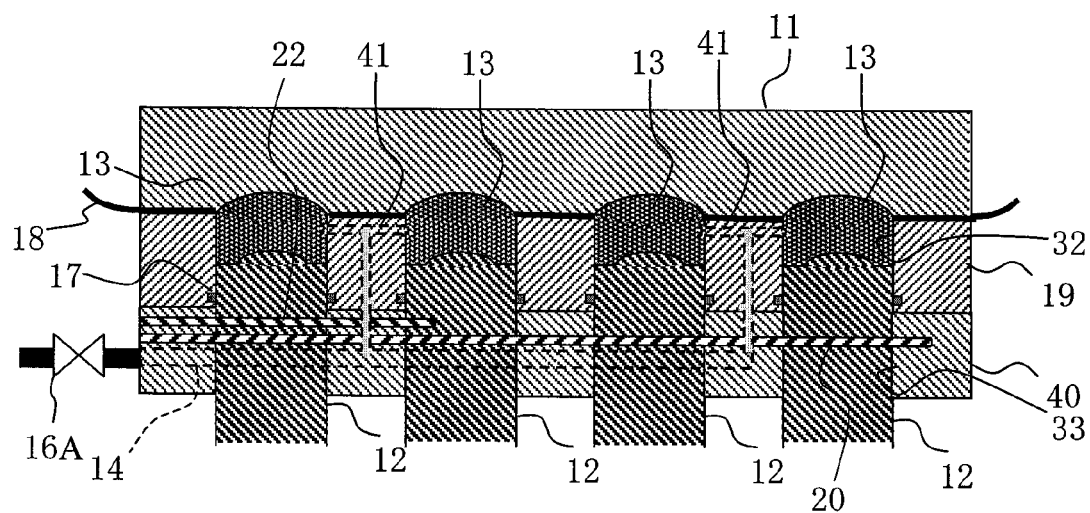

FIG. 3A illustrates one embodiment of the present invention, where the delivery path 14 extends to the die center to have the delivery path branches 41 of the same length from the delivery path 14 to the cavities 13. FIG. 3B illustrates another embodiment, where the total length of the delivery path branches 41 branching from the delivery path 14 is minimized.

The mortar-shaped die 19 and heater block 40 are provided with the respective through-holes 32 and 33 continuing from each other to insert the lower dies 12 into them from the lower side.

Each of the lower dies 12 compression-molds the slurry at the stroke end into a given shape in the cavity 13. The mortar-shaped die 19 is provided with the sealing member 17 with which the gap between itself and a lower die 12 is sealed.

The filter cloth 18 is provided over the mating surfaces between the upper die 11 and mortar-shaped die 19, to discharge moisture in the slurry from the cavity 13. It allows moisture in the slurry to trickle from the mating surfaces between the upper die 11 and mortar-shaped die 19 to the outside.

A magnetic field generating coil (not shown) or the like is provided in the vicinity of the upper die 11, to apply the magnetic field to the slurry in a given direction.

In this embodiment, the heater members 20, each composed of electrically heating wire, ceramic heater and so forth, are embedded in the heater block 40 in such a way to run along the delivery path 14. The heater members 20 are preferably arranged in a pattern determined to uniformly heat the individual cavities 13.

As illustrated in FIG. 2, for example, each of the heater members 20 may be arranged to run along each row of the cavities 13 formed in the mortar-shaped die 19. In this case, the number of the heater members 20 is preferably at least "m", where "m" is the number of rows of the cavities 13.

Figure 4:
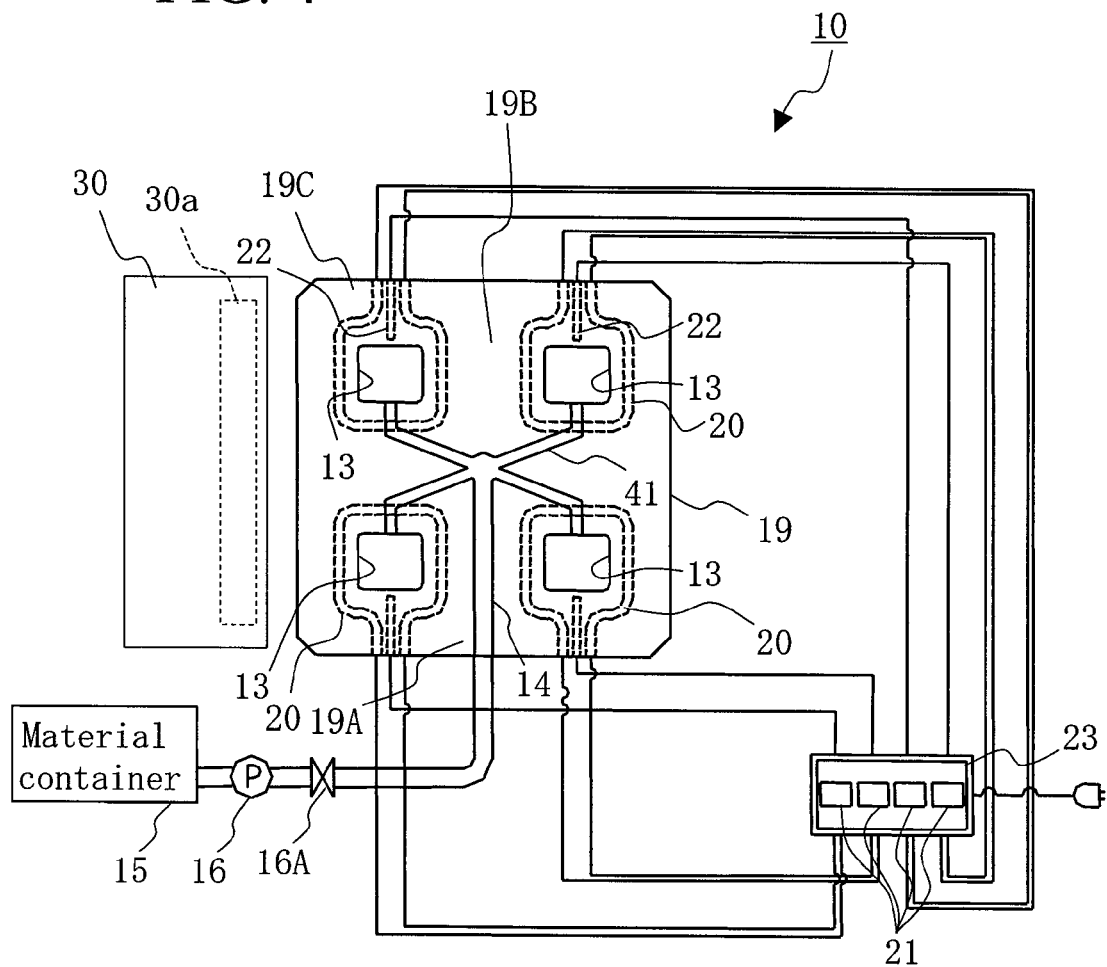
FIG. 4 illustrates another embodiment of arrangement of the heaters in the molding device provided with a plurality of cavities.

Moreover, the heater members 20 may be provided in such a way that each corresponds to each of the cavities 13 in the mortar-shaped die 19, as illustrated in FIG. 4. In this case, the heater member 20 is preferably provided at a position corresponding to each of the cavities 13 in the heater block 40. The number of the heater members 20 is preferably at least "n", where "n" is the number of the cavities 13. The heater member 20 may be positioned in such a way to selectively heat the delivery path 14 inlet vicinity.

Each of the heater members 20 is connected to a heater power source (not shown), which applies a voltage to the heater member 20 to generate heat there, which heats the heater block 40 and the slurry flowing in the delivery path 14. The heated heater block 40 heats the mortar-shaped die 19 and the slurry flowing in the delivery path branches 41.

As the heater member 20, circulating a liquid (heating medium), electromagnetic induction or the like, may be employed, instead of an electrical heater.

The heater is composed of the heating members 20 and one or more heater power sources (not shown).

The heater block 40 is provided with the temperature sensor 22, e.g., of thermocouples, and also with a controller (not shown) for controlling the heater power source (not shown), based on temperature sensed by the sensor 22.

It is preferable to provide a plurality of the sensors 22 for finely control temperature by the controller (not shown) Therefore, the sensors 22 may be positioned at each of the cavities 13 or in the vicinity thereof. These sensors 22 are preferably provided in the heater block 40 also in this case. Moreover, a plurality of groups, each comprising a plurality of the heater members 20 individually corresponding to the cavities 13, may be provided and the heater members 20 in each group may be collectively controlled by the controller (not shown). In this case, the sensor 22 may be provided one for each group having a plurality of the cavities 13.

The controller (not shown) controls the heater power sources (not shown) based on temperature at each position individually sensed by the sensor 22, to individually control heat to be generated by the heater members 20. Controlling heat generated by the heater members 20, based on temperature at each position, can uniformly keep slurry temperature in each cavity 13, because it is heated while flowing in the delivery path 14 and delivery path branches 41.

In the above structure, a plurality of the heater members 20 are employed, based on the premise that each generates a common heat quantity. However, the structure is not limited to the above, and a plurality of the heater members 20 of different heating value may be used. In this case, when one heater power source (not shown) applies the same voltage to all of the heater members 20, the heating value for the individual heater member 20 is different. Therefore, the types of the heater member 20 are selected in such a way that temperature distribution in the mortar-shaped die 19 can be controlled, based on changed temperature at each position therein. In addition, the controller (not shown) can collectively control all of the heater members 20, possibly by a mere ON/OFF control mode.

The heater member 20 may have a heating value varying depending on the position. For example, winding pitch of an electrically heating wire may be changed depending on the position in the same heater to locally change the heating value. Thus, the heating value applied from the heater member 20 can be changed depending on the position.

In the heater block 40, the temperature in the vicinity of the delivery path 14 is decreased every time a slurry heated by the heater member 20 is introduced into each of the cavities 13, and a fresh slurry is supplied from the container 15. The other regions spaced from the delivery path 14 or outside of the area in which the cavity 13 is provided are affected less by the slurry and change less in temperature.

When the mortar-shaped die 19 carries out a plurality of molding cycles continuously, its surface may be washed between the molding cycles. It may be automatically washed by the washing device 30 with the brush 30a moving on the surface back and forth after it is immersed in a wash solution. In this case, it may have temperature decreased by the wash solution, more notably at a position closer to the washing starting point, on the while the temperature in the opposite position changes less.

Therefore, slurry temperature can be kept uniform in each of the cavities 13, even at a position at which the mortar-shaped die 19 tends to have an uneven temperature distribution, by heating the slurry after setting an optimum temperature at each position on the die 19. This reduces slurry dehydration property variations cavity by cavity to minimize the variation in density of the molded body and product weight.

In the magnetic field molding device 10 of the above structure, the slurry kneaded in the above-mentioned Step S106 is distributed/supplied by the pump 16 from the material container 15 to each of the cavities 13 between the upper die 11 and the lower die 12 via the delivery path 14. When the cavities 13 are filled with a given quantity of the slurry, the lower die 12 is driven to press the slurry at a given pressure between the upper die 11 and the lower die 12, while a magnetic field generated by the magnetic field generating coil (not shown) or the like is applied to the slurry. This molds the slurry into a given shape while it is dehydrated, with moisture in the slurry trickling to the outside via the filter cloth 18. Application of a magnetic field may be started immediately before the cavity is filled with the slurry. The magnetic field, when applied while the cavity is being filled with the slurry, agglomerates the ferrite particles and accelerates dehydration.

On completion of the molding, the upper die 11 is opened to release the molded body formed into a given shape from the lower die 12.

In the molding in a magnetic field, as discussed above, the controller (not shown) controls the heater members 20 provided in the heater block 40 to heat (adjust) the slurry flowing in the delivery path 14 and delivery path branches 41 at a given temperature level. In this case, it is preferable that the heater members 20 work to keep temperature T1, sensed by the sensor 22 at each position, at 40° C. or higher. At below 40° C., the slurry heating effect may not be notably observed. At above 120° C., on the other hand, water in the slurry may boil depending on cavity 13 internal pressure (i.e., slurry pressure). Therefore, the upper limit of the temperature level T1 of each position is preferably at 120° C. or lower, more preferably 100° C. or lower, still more preferably 80° C. or lower. Therefore, it is preferable to control the heater power source (not shown) by the controller (not shown), based on temperature sensed by the sensor 22.

When the heater members 20 work to keep temperature T1 at 50° C., temperature T2 of the slurry in the cavity 13 will be 43° C., when T1 is 60° C., T2 will be 49° C., and so on.

Heating the slurry flowing in the delivery path 14 and delivery path branches 41 by the heater members 20 provided in the heater block 40 can increase slurry temperature in the cavities 13 more assuredly than a structure which heats a slurry before it is injected in a die. As a result, it can dehydrate the slurry by decreasing viscosity of the slurry dispersion medium and thereby improve product yield.

Moreover, the heater members 20 are provided in the heater block 40, provided separately from the mortar-shaped die 19, together with the delivery path 14. By providing the heater members 20 in the heater block 40 separate from the mortar shaped die 19, works for mounting the heater members 20 are facilitated, even when the mortar-shaped die 19 is made of a superhard metal or the like, without exerting any effect on die strength and hence causing no deterioration of its durability and forming precision. Moreover, the heater members 20 run along the delivery path 14 in the heater block 40 to realize an efficient structure which can efficiently heat the slurry flowing in the delivery path 14.

Moreover, the slurry can be heated uniformly in each of the cavities 13, because it is heated by the heating members 20 after setting each position at an optimum temperature. This reduces slurry dehydration property variations cavity by cavity, and hence minimizes the variation in density of the molded bodies finally obtained and product weight.

As discussed above, temperature can be kept uniform in each of a plurality of the cavities 13, even when the die in which they are provided has a large size, to realize a uniform density of the molded bodies finally obtained. Still more, the structure allows for production of ferrite magnets with stable qualities, because it is affected less by seasonally changing ambient temperature.

The total volume of the delivery path 14 is set to be at least the same as the slurry volume to be injected for one molding cycle, and the slurry can be assuredly and efficiently heated in the delivery path 14 before being injected into the cavities 13 while the previous charge is molded in the cavities 13 and the above-mentioned effects are assuredly obtained. When, for example, 16 molded bodies each having a weight of 40 g (on a dry basis) are to be produced in one cycle, i.e., by the die provided with 16 cavities, the delivery path 14 preferably has a volume of 325 cm$^3$ or more when the slurry has a concentration of 76% and density of 2.59 g/cm$^3$.

When the total volume of the delivery path 14 is smaller than the slurry volume for one molding cycle, it is preferable to pre-heat the slurry by a heater or the like before it is sent into the delivery path 14 by the pump 16 from the material container 15.

EXAMPLE 1

The relationship between slurry temperature and cavity internal pressure was investigated. The results are described below.

First, the molding slurry was prepared by the process flow illustrated in FIG. 1, where water was used as the dispersion medium for the slurry.

The slurry kept at a varying temperature level was injected into a disk-shape cavity (diameter: 30 mm) under constant conditions. Then, it was molded in a magnetic field under constant molding conditions, where the magnetic field molding device used was the same as the above-described magnetic field molding device 10, except that it was provided with one cavity (cavity 13), and provided with none of the heater member 20, heater power source (not shown), sensor 22 and controller (not shown). The highest pressure determined by a pressure sensor, provided in the close vicinity of the delivery path 14 and on the slurry injection route outside of the mortar-shaped die 19 was recorded as cavity internal pressure. The slurry was measured for its temperature 20 seconds after it was injected into the cavity, and was recorded as slurry temperature. Cavity internal pressure can be used as a measure of slurry dehydration properties; lower pressure being considered to indicate higher dehydration properties. The results are given in FIG. 5.

Figure 5:
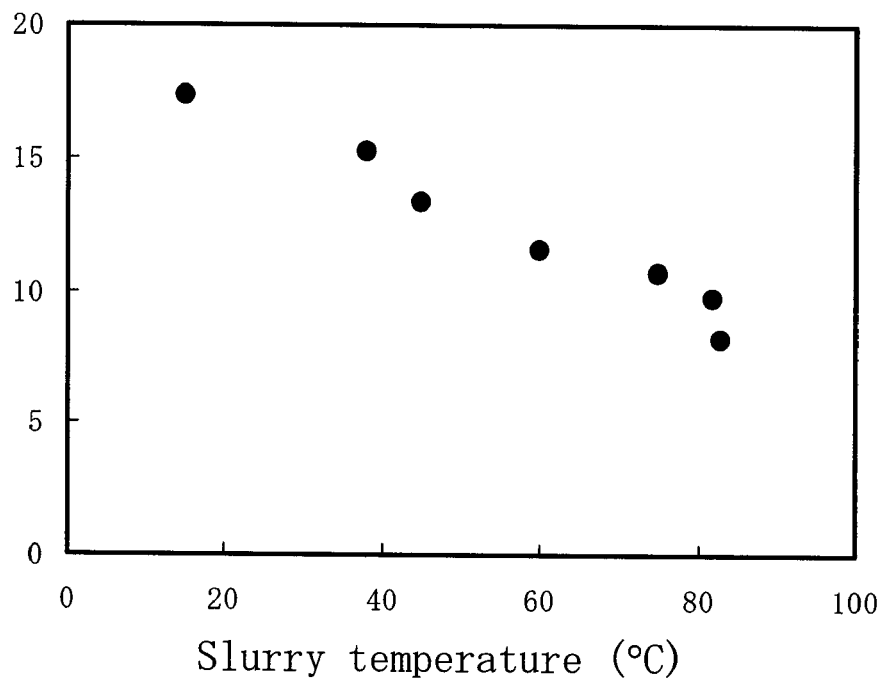
FIG. 5 shows the relationship between slurry temperature and cavity internal pressure.

As illustrated in FIG. 5, it was confirmed that cavity internal pressure is decreased as slurry temperature is higher.

Next, the relationship between die temperature and cavity internal pressure was investigated. The results are described below.

A molding slurry was prepared by the process illustrated in FIG. 1, where water was used as a slurry dispersing medium.

The slurry was formed into ferrite magnets of given shape and size having an essentially arc-shaped cross-section by the magnetic field molding using the magnetic field molding device 10 illustrated in FIG. 3, where the heater block 40 was heated by the heating members 20 at varying temperature of 25° C. (not heated), or 40, 50, 60 or 70° C. Cavity internal pressure was determined by the procedure described above. The results are given in FIG. 6.

Figure 6:
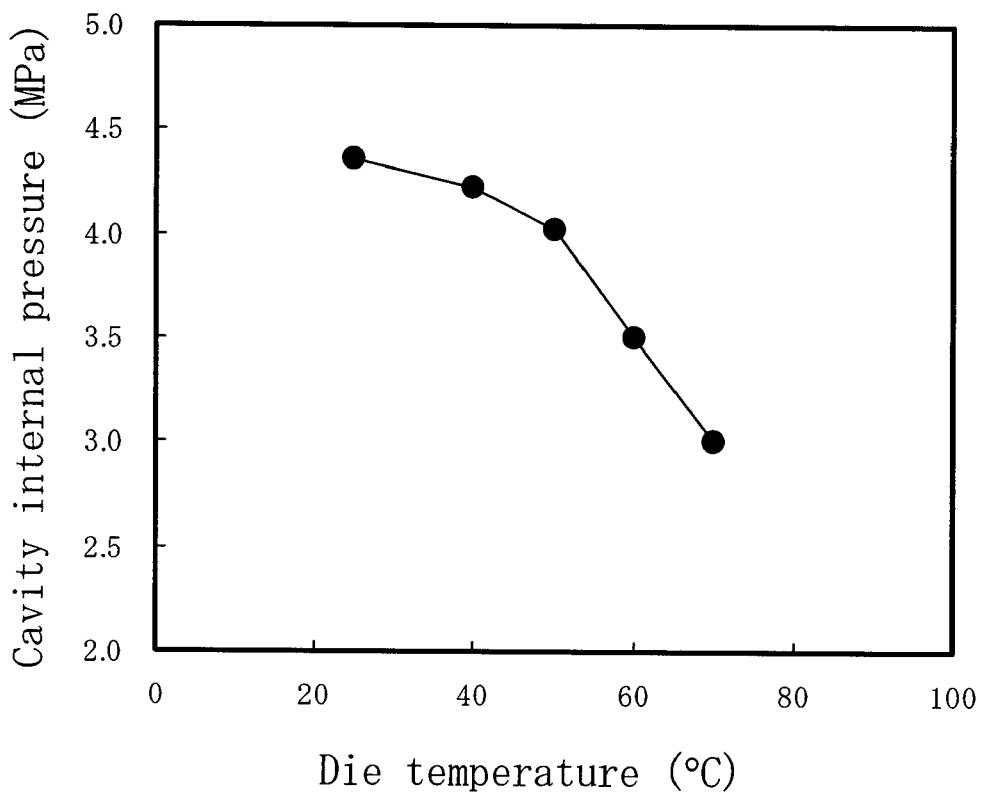
FIG. 6 shows the relationship between die temperature and cavity internal pressure.

As shown in FIG. 6, increasing die temperature has an effect of decreasing cavity internal pressure. However, in order to realize the effect notably as compared to the non-heating case, die temperature is preferably set at above 40° C. At the same time, die temperature is preferably set at 100° C. or lower, because water in the slurry may be generated into bubbles through boiling at the temperature above 100° C. or above 120° C., although depending on cavity internal pressure, i.e., slurry pressure.

Slurry temperature was 36° C. when die temperature was set at 40° C., and the dispersion medium (water) had a viscosity of 0.70 [mPa·s] at the above temperature level.

Figure 7:
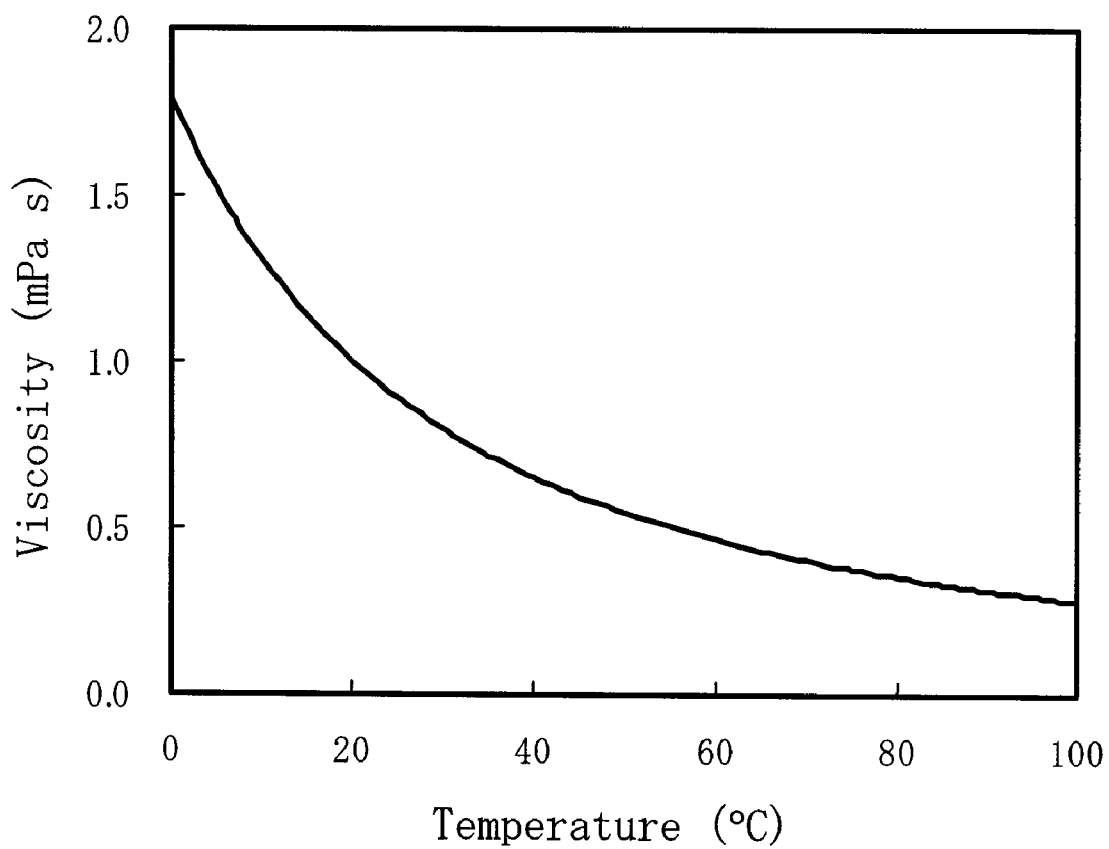
FIG. 7 shows the relationship between temperature and viscosity of the dispersion medium.

FIG. 7 shows the relationship between temperature and viscosity of the dispersion medium (water). Increasing temperature reduces water viscosity and improves slurry dehydration properties. In other words, it can be said that cavity internal pressure decreases notably as viscosity of the dispersion medium (water) decreases to less than 0.70 [mPa·s].

EXAMPLE 2

Example 2 confirmed the effect of independently controlling temperature for a plurality of the cavities 13 provided in the mortar-shaped die 19.

Figure 8:
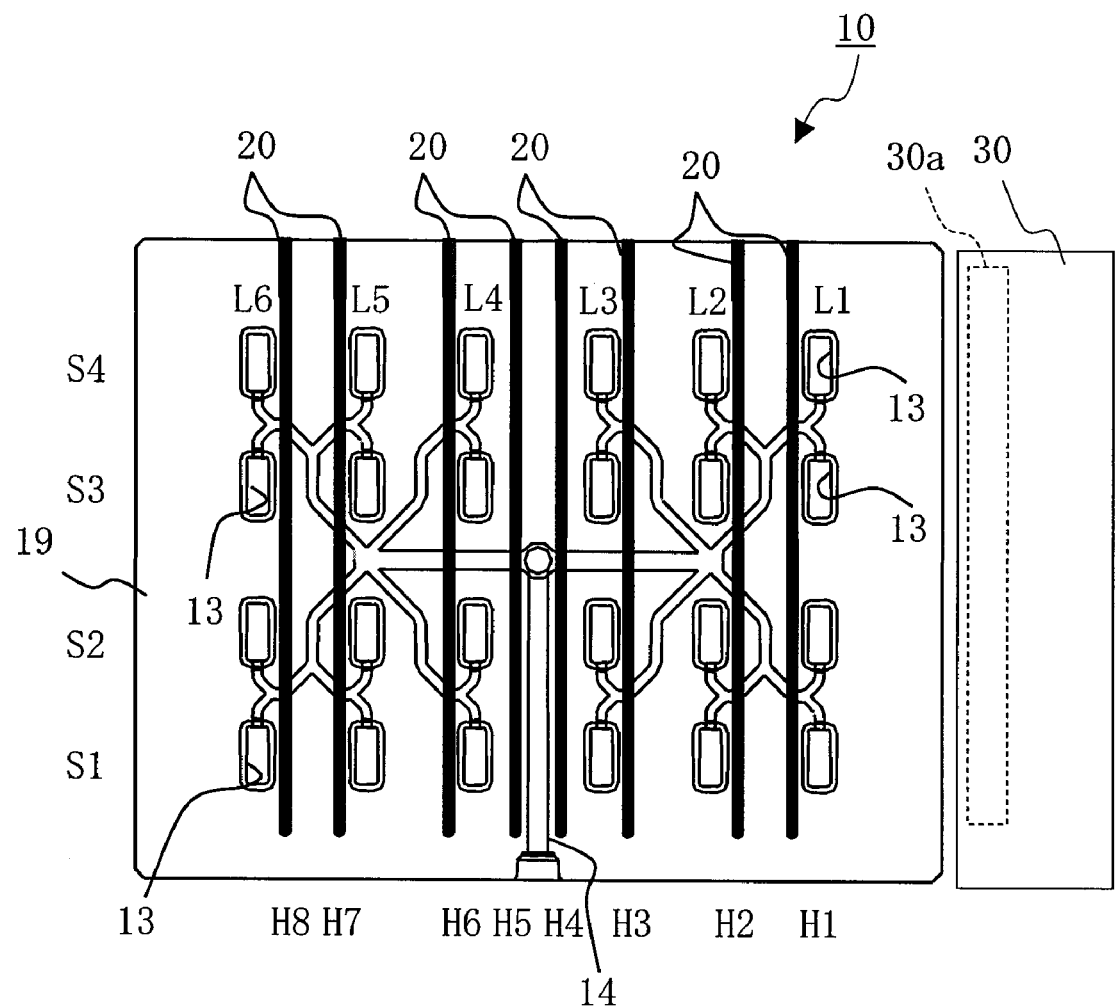
FIG. 8 illustrates the die structure adopted in Example 2.

Referring to FIG. 8, a total of six rows, each row having the 4 cavities 13 of given shape, was arranged in the mortar-shaped die 19 and the heater members 20 were arranged in such a way to lie next to each row. The heater members 20 were provided also on both sides of delivery path 14 for supplying the slurry from the outside.

The slurry was injected into the cavities 13 in the mortar-shaped die 19 from the delivery path 14 and formed into ferrite magnets of given shape and size having an essentially arc-shaped cross-section by the magnetic field molding under given conditions. The slurry was prepared in the same manner as in Example 1.

Under Example 1 conditions, shown in Table 1, a controller (not shown) controlled the heater members 20 to generate heat and keep them at 50° C., sensed by the sensor 22. Under Comparative Example 1 conditions, the magnetic field molding was carried out without heating by the heater members 20.

The molded bodies produced in each of the cavities 13 were weighed.

TABLE 1

|  | H8 | H7 | H6 | H5 | H4 | H3 | H2 | H1 | R (g) | σ (g) | R (%) | σ (%) |
|---|---|---|---|---|---|---|---|---|---|---|---|---|
| Comparative Example 1 conditions | 20° C. | 20° C. | 20° C. | 20° C. | 20° C. | 20° C. | 20° C. | 20° C. | 0.51 | 0.559 | 1.7 | 0.559 |
| Example 1 conditions | 50° C. | 50° C. | 50° C. | 50° C. | 50° C. | 50° C. | 50° C. | 50° C. | 0.52 | 0.441 | 1.7 | 0.441 |
| Example 2 conditions | 40° C. | 42° C. | 47° C. | 50° C. | 50° C. | 50° C. | 52° C. | 55° C. | 0.46 | 0.394 | 1.5 | 0.394 |
| Example 3 conditions | 37° C. | 42° C. | 50° C. | 52° C. | 52° C. | 52° C. | 52° C. | 48° C. | 0.31 | 0.302 | 1.0 | 0.302 |

Figure 9:
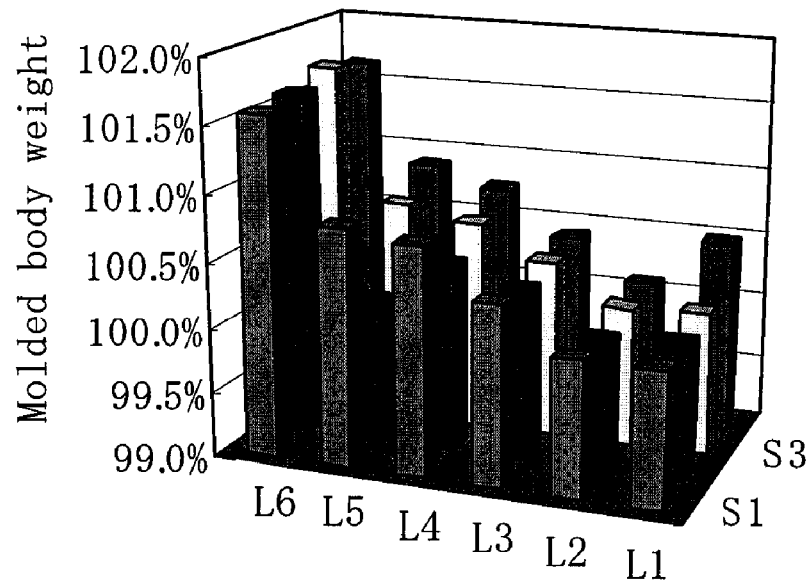
FIG. 9 illustrates the relationship between cavity position and molded body weight, observed under Comparative Example 1 conditions.
Figure 10:
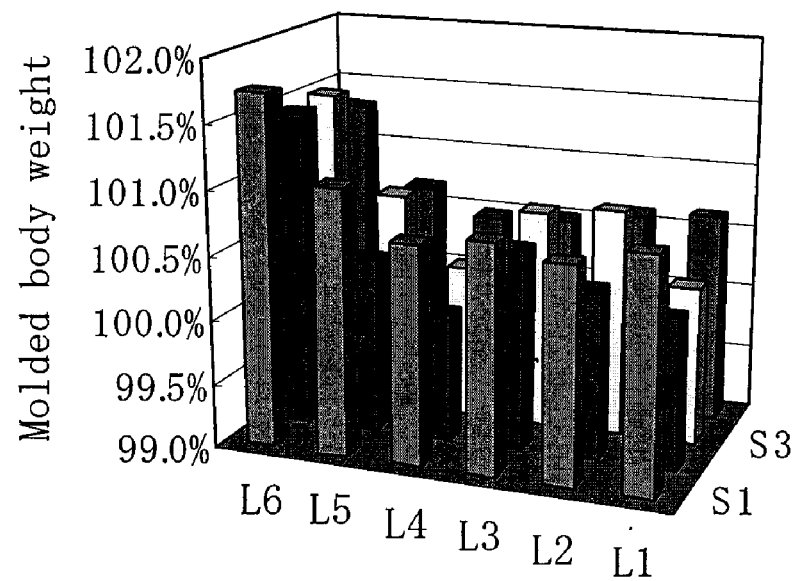
FIG. 10 illustrates the relationship between cavity position and molded body weight, observed under Example 1 conditions.

The results are given in FIGS. 9 and 10, where the cavity 13 positions in the mortar-shaped die 19 are represented by rows L1 to L6 and columns S1 to S4 as shown in FIG. 8. In FIG. 8, the heating member positions are represented by rows H1 to H8.

As shown in FIG. 9, under Comparative Example 1 conditions with no heating by the heating members 20, the molded bodies formed in the cavities 13 varied in weight from 100 to 101.7% relative to weight of the molded body having the lightest weight, with a varying range R of 1.7% and standard deviation σ of 0.559%. It is also noted that the weight tends to increase slowly as the row moves from L1 to L6, conceivably resulting from the cavity on the L1 side decreasing in temperature more than on the L6 side in the mortar-shaped die 19, because the washing device 30 was provided on the L1 side and L1 side cavity was affected more by a wash solution during the washing period.

On the other hand, under Example 1 conditions with heating by the heating members 20, the molded bodies formed in the cavities varied in weight from 100.0 to 101.7% relative to weight of the molded body having the lightest weight, with a varying range R of 1.7% and standard deviation σ of 0.441%, confirming smaller variations than under Comparative Example 1 conditions as shown in FIG. 10. It is considered that this resulted from the reduced wash solution effect, because the L1 side, on which temperature is significantly decreased by the wash solution effect, was heated.

Figure 11:
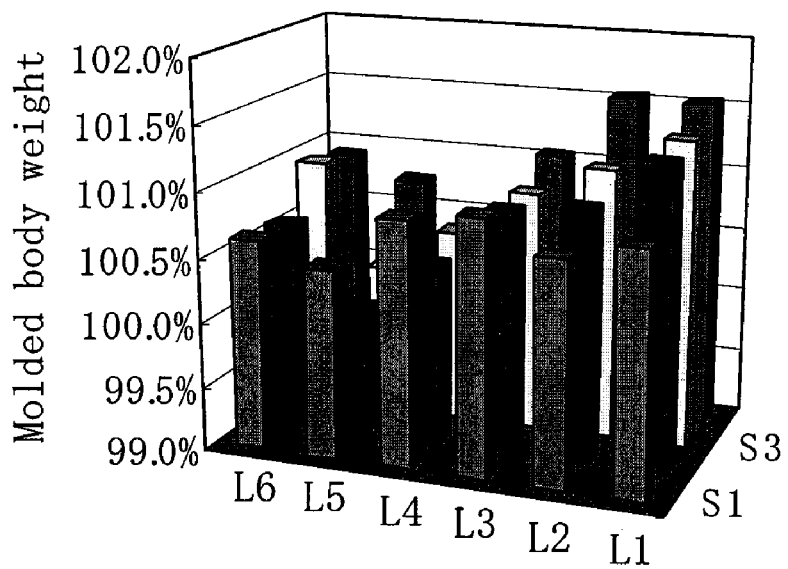
FIG. 11 illustrates the relationship between cavity position and molded body weight, observed under Example 2 conditions.

However, the weight tended to increase slowly as the row moves from L1 to L6 even under Example 1 conditions, although to a smaller extent than under Comparative Example 1 conditions. Therefore, Example 2 conditions were set, under which the magnetic field molding was carried out with temperature increasing by the heater members 20 from H8 side to H1 side, as shown in Table 1. As a result, the molded bodies varied in weight from 100.0 to 101.5% relative to weight of the molded body having the lightest weight, with a varying range R of 1.5% and standard deviation σ of 0.394%. It is apparent, as shown in FIG. 11, that the weight shows no tendency of slowly increasing as the row moves from L1 to L6, with the molded bodies formed on the L1 side, kept at a higher temperature, having a higher weight.

In order to further improve the molding conditions, Example 3 conditions were set, under which the magnetic field molding was carried out with slightly decreasing the temperature of heating members positioned at H1 near the L1 side, which gave the heavier molded bodies under Example 2 conditions, as shown in Table 1.

Figure 12:
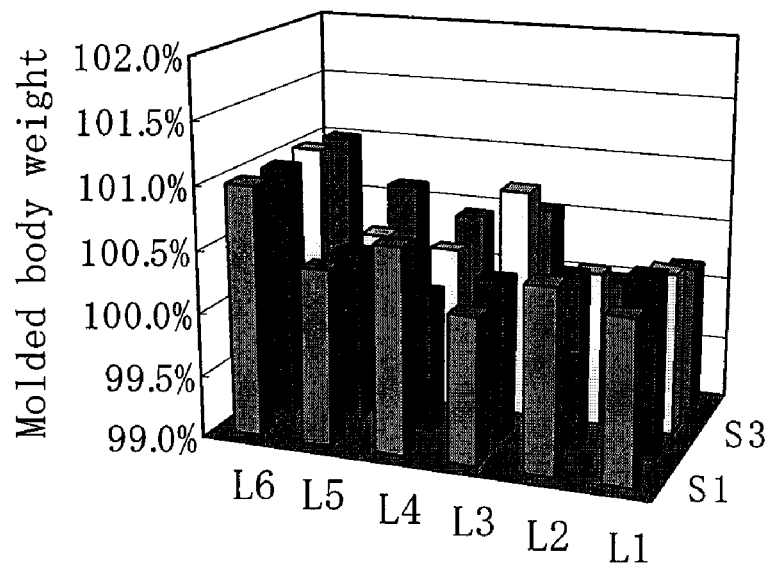
FIG. 12 illustrates the relationship between cavity position and molded body weight, observed under Example 3 conditions.

As a result, the molded bodies varied in weight from 100.0 to 101.0% relative to weight of the molded body having the lightest weight, with a varying range R of 1.0% and standard deviation a of 0.302%, reducing variations and averaging the molded body weight, as shown in FIG. 12.

Based on these results, further improvements can be expected by setting temperature-adjusting conditions more finely by the heater members 20.

The ferrite magnets prepared were tested. The results are given in FIG. 13.

Figure 13:
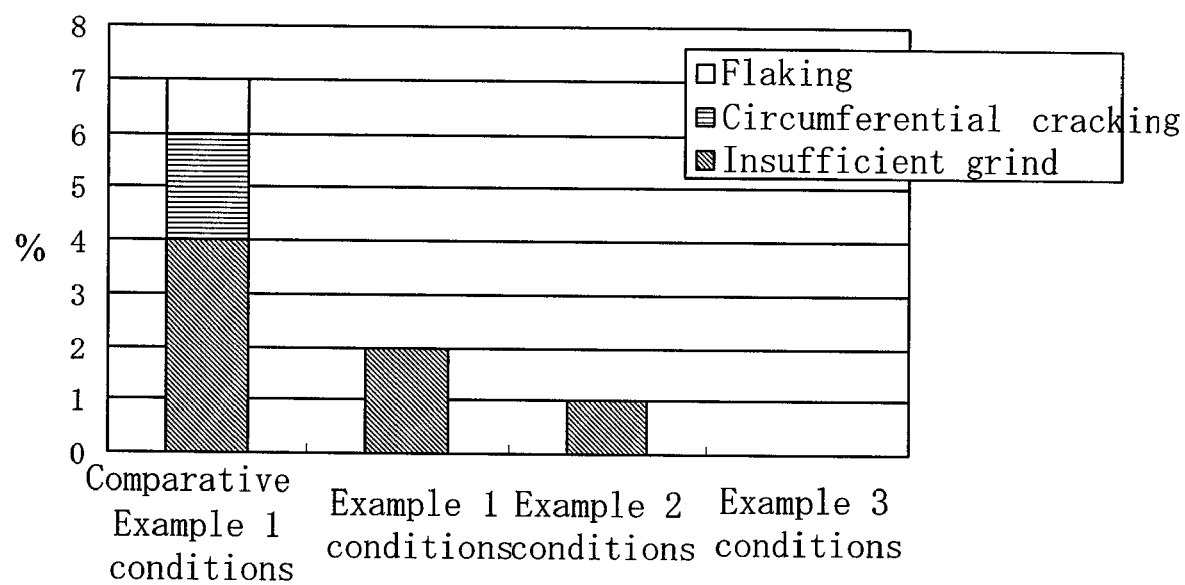
FIG. 13 shows incidence rate comparison of defective products produced under Comparative Example 1, and Example 1-3 conditions.

As shown in FIG. 13, Examples 1 to 3 conditions with die heating produced defective products less than Comparative Example 1 conditions with no die heating, where the defective products are characterized by circumferential cracking (a phenomenon in which a molded body is cracked because of insufficient molding density, resulting from insufficient slurry dehydration properties during the molding process), flaking (a phenomenon in which a molded body surface comes off while the body is released from a mortar-shaped die 19, because of insufficient molding density) or black skin (a phenomenon in which a molded body has a size smaller than specified, and cannot be satisfactorily polished and has a insufficient grind left, because of insufficient molding density). In particular, it is confirmed that Examples 2 and 3, carried out under conditions set to have a more uniform temperature distribution in the mortar-shaped die 19, produced essentially no defective products.

What is claimed is:

1. A magnetic field molding device used in producing a ferrite sintered magnet, comprising:
    a die for compression-molding a molding slurry, wherein the slurry is produced by dispersing a powder mainly composed of ferrite in a dispersion medium and injected into the die,
    a magnetic field generating source for applying a magnetic field to the slurry within the die in a given direction,
    a delivery path provided in the die for injecting the slurry into a cavity for forming the ferrite sintered magnet,
    a heater provided under the cavity for heating the slurry flowing in the delivery path,
    a controller for controlling the heater, and
    a mortar shaped die cooperatively forming a portion of said die, said mortar shaped die having a bottom and a separate block member that may remain fixed to the bottom throughout a plurality of molding cycles, said heater and delivery path being provided in said block member with said heater being positioned along said delivery path.

2. The magnetic field molding device according to claim 1, wherein the controller controls the temperature of the block member from 40 through 120° C.

3. The magnetic field molding device according to claim 1, wherein the die is provided with a plurality of the cavities for producing a plurality of the ferrite sintered magnets.

4. The magnetic field molding device according to claim 3, further comprising a temperature control unit to control the temperature distribution in the plurality of the cavities in the die.

5. The magnetic field molding device according to claim 1, wherein said delivery path has a path volume, said cavity has a slurry volume to be injected for one molding cycle and said path volume is at least equal to said slurry volume for one molding cycle.

6. The magnetic field molding device according to claim 1, wherein said cavity is formed in said mortar shaped die and said block member is provided under said cavity.

7. A magnetic field molding device used in producing a ferrite sintered magnet, comprising:
- a die for compression-molding a molding slurry, wherein the slurry is produced by dispersing a powder mainly composed of ferrite in a dispersion medium and injected into a plurality of cavities,
- a magnetic field generating source for applying a magnetic field to the slurry within the die in a given direction,
- a delivery path for injecting the slurry into each of the cavities, and
- a temperature control unit to control the temperature distribution in the plurality of cavities in the die, wherein:
- the temperature control unit comprises a plurality of heaters provided in the die for heating the die, and a controller for controlling the plurality of heaters independently, and,
- a mortar shaped die cooperatively forming a portion of said die, said mortar shaped die having a bottom and a separate block member that may remain fixed to the bottom throughout a plurality of molding cycles, the plurality of heaters being provided in said block member along the delivery path whereby viscosity of the dispersion medium injected into the plurality of cavities is lowered.

8. The magnetic field molding device according to claim 7, wherein the temperature control unit comprises:
- the plurality of heaters provided in the die and having different heating values and
- the controller for controlling the plurality of heaters collectively.

9. The magnetic field molding device according to claim 7, wherein each of the heaters of the plurality of heaters has a heating value depending on the position of the heater.

10. The magnetic field molding device according to claim 7, wherein the number of the heaters in the plurality of heaters is at least "m", where "m" is the number of rows of the cavities orderly lined up in the die.

11. The magnetic field molding device according to claim 7, wherein the number of the heaters in the plurality of heaters is at least "n", where "n" is the number of the cavities in the die.

12. The magnetic field molding device according to claim 7, wherein said delivery path has a path volume, said cavities have a slurry volume to be injected for one molding cycle and said path volume is at least equal to said slurry volume to be injected for one molding cycle.

13. The magnetic field molding device according to claim 7, wherein said cavities are formed in said mortar shaped die and said block member is provided under said cavity.

* * * * *